United States Patent
Armitage et al.

(10) Patent No.: US 11,598,423 B2
(45) Date of Patent: Mar. 7, 2023

(54) DYNAMIC SEAL

(71) Applicant: SAINT-GOBAIN PERFORMANCE PLASTICS CORPORATION, Solon, OH (US)

(72) Inventors: Mark W. Armitage, Madison, CT (US); Douglas George, Trumbull, CT (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 58 days.

(21) Appl. No.: 17/121,855

(22) Filed: Dec. 15, 2020

(65) Prior Publication Data

US 2021/0199197 A1    Jul. 1, 2021

Related U.S. Application Data

(60) Provisional application No. 62/954,058, filed on Dec. 27, 2019.

(51) Int. Cl.
    *F16J 15/3284*    (2016.01)
(52) U.S. Cl.
    CPC .................. *F16J 15/3284* (2013.01)
(58) Field of Classification Search
    CPC ...... F16J 15/0887; F16J 15/16; F16J 15/3284; F16J 15/54
    See application file for complete search history.

(56) References Cited

U.S. PATENT DOCUMENTS

| 3,394,915 A |   | 7/1968 | Gachot |
| 3,468,171 A |   | 9/1969 | Macielinski |
| 4,067,585 A | * | 1/1978 | Rode ............... F16J 15/0887 |
|             |   |        | 277/379 |
| 4,319,758 A |   | 3/1982 | Nicholson |
| 4,457,523 A |   | 7/1984 | Halling et al. |

(Continued)

FOREIGN PATENT DOCUMENTS

| EP | 2529828 A1  | 12/2012 |
| JP | 2010249149 A | 11/2010 |
| WO | 2011119211 A1 | 9/2011 |

OTHER PUBLICATIONS

International Search Report and Written Opinion for PCT/US2020/064994, dated Mar. 15, 2021, 9 pages.

*Primary Examiner* — Gilbert Y Lee
(74) *Attorney, Agent, or Firm* — Abel Schillinger, LLP; Robert N Young

(57) ABSTRACT

Systems and methods are disclosed that include providing an outer tubular member, an inner tubular member telescopically disposed within the outer tubular member, and an annular seal disposed between the outer tubular member and the inner tubular member, the annular seal being resilient to permit relative movement between the outer tubular member and the inner tubular member, and the annular seal having in a radial cross-section: a first annular leg portion terminating at an end that is radially inward or radially outward, the first annular leg portion comprising a first open loop; and a second annular leg portion extending from the first annular leg portion and terminating at an end that is the other of radially inward or radially outward, the second annular leg portion comprising a second open loop.

20 Claims, 6 Drawing Sheets

(56) References Cited

U.S. PATENT DOCUMENTS

| | | | |
|---|---|---|---|
| 4,505,290 A | | 3/1985 | Scobie |
| 4,602,888 A | * | 7/1986 | Court ..................... F16L 23/20 |
| | | | 277/645 |
| 4,854,600 A | | 8/1989 | Halling et al. |
| 5,240,263 A | | 8/1993 | Nicholson |
| 5,630,593 A | * | 5/1997 | Swensen .............. F16J 15/0887 |
| | | | 277/626 |
| 5,669,612 A | | 9/1997 | Nicholson |
| 5,716,052 A | * | 2/1998 | Swensen .............. F16J 15/0887 |
| | | | 277/654 |
| 5,947,479 A | | 9/1999 | Ostrowski |
| 6,302,402 B1 | | 10/2001 | Rynders et al. |
| 8,152,172 B2 | | 4/2012 | Halling |
| 9,957,827 B2 | * | 5/2018 | Davis .................... F01D 11/005 |
| 10,487,943 B2 | * | 11/2019 | Davis ................... F16J 15/0887 |
| 2017/0219100 A1 | | 8/2017 | Kaobayashi et al. |

\* cited by examiner

DYNAMIC SEAL

CROSS-REFERENCE TO RELATED APPLICATION(S)

This application claims priority under 35 U.S.C. § 119(e) to U.S. Provisional Application No. 62/954,058, entitled "DYNAMIC SEAL," by Mark W. ARMITAGE et al., filed Dec. 27, 2019, which is assigned to the current assignee hereof and incorporated herein by reference in its entirety.

BACKGROUND OF THE INVENTION

Traditional seals, such as axial c-ring seals and other lipseals are suitable for sealing between two approximately concentric tubular members. The sealing interface is typically generated by interference fits between the seal and the concentric tubular members. Thermal, mechanical, and vibrational forces can cause relative displacement between the seal and one or both tubular members during operation. This relative displacement can result in wear in one or more of the tubular members and/or the seal, thereby requiring special and costly wear protective coatings, costly diameter and surface finish requirements, and/or frequent refinishing.

SUMMARY

Embodiments of the present invention relate in general to a dynamic, resilient metallic seal for the containment of pressurized fluids, including gases, from cryogenic to highly elevated temperatures where thermal expansion is anticipated, and more particularly, to a dynamic metal seal for isolating one or more fluids in an annulus formed between two approximately concentric tubular members or opposed axially facing surfaces permitting reciprocating axial, radial, or lateral offset or angular displacement and misalignment capability between the concentric tubular members. The seal, by eliminating sliding motion during reciprocating axial displacement due to mechanical, vibrational, thermal, or other loads, reduces or eliminates wear between the outer tubular member and the inner tubular member and their respective seal interfaces.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
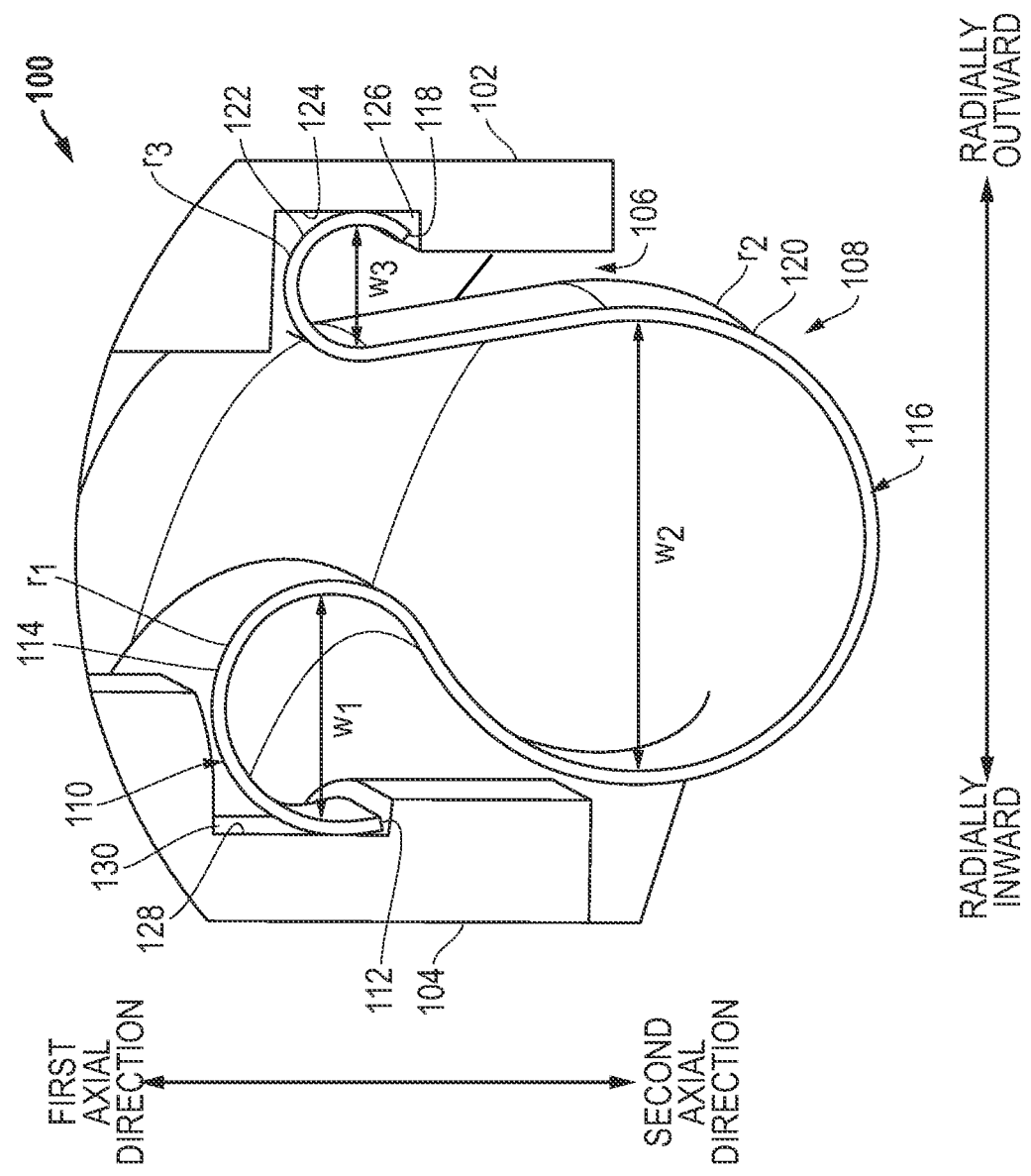
FIG. 1 is a cross-sectional view of a seal assembly according to an embodiment of the disclosure.

FIG. 1 shows a cross-sectional view of a seal assembly 100 according to an embodiment of the disclosure. The seal assembly 100 may generally comprise an outer tubular member 102 having an inner diameter and an inner tubular member 104 having an outer diameter and disposed within the outer tubular member 102, such that the inner diameter of the outer tubular member 102 and the outer diameter of the inner tubular member 104 form an annulus 106 therebetween. The seal assembly 100 may also comprise an annular seal 108 disposed between the outer tubular member 102 and the inner tubular member 104 to seal the annulus 106. As such, in some embodiments, the annular seal 108 may be substantially resilient to permit relative movement between the outer tubular member 102 and the inner tubular member 104 caused by thermal, mechanical, and/or vibrational loads while maintaining a fluid tight seal within the annulus 106.

In the embodiment shown, the annular seal 108 may generally comprise an Omega-shaped cross section comprising three opposing arcuate convolutions. The annular seal 108 may generally comprise a first annular leg portion 110 that terminates at an end 112. In some embodiments, the first annular leg portion 110 may comprise a first open loop 114. Depending on the configuration of the annular seal 108, the end 112 of the first annular leg portion 110 may be disposed radially inward or outward with respect to the annulus 106. The annular seal 108 may also comprise a second annular leg portion 116 that extends from the first annular leg portion 110 and terminates at an end 118. In some embodiments, the second annular leg portion may comprise a second open loop 120. Additionally, in some embodiments, the second annular leg portion may also comprise a third open loop 122.

Depending on the configuration of the annular seal 108, the end 118 of the second annular leg portion 116 may be disposed radially inward or outward with respect to the annulus 106 and opposite of the end 112. Accordingly, when the end 112 of the first annular leg portion 110 is radially inward, the end 118 of the second annular leg portion 116 is radially outward, and vice versa. In some embodiments, end 112 of the first annular leg portion 110 may be restrainably attached to the outer tubular member 102 or the inner tubular member 104. Additionally, in some embodiments, the end 118 of the second annular leg portion 116 may be restrainably attached to the other of the outer tubular member 102 and the inner tubular member 104. Thus, in some embodiments, the ends 112, 118 may be restrainably attached to the tubular members 102, 104 via adhesive bonding, circlips, clips, fasteners, interference fit, other known restraining devices, or any combination thereof.

In some embodiments, the outer tubular member 102 may comprise a substantially constant inner diameter. In some embodiments, the inner tubular member 104 may comprise a substantially constant outer diameter. However, in some embodiments, the outer tubular member 102 and/or the inner tubular member 104 may comprise features that restrainably attach, locate, and/or receive portions of the annular seal 108 with respect to the outer tubular member 102, inner tubular member 104, the annulus 106, or combinations thereof. For example, in the embodiment shown, the outer tubular member 102 may comprise an increased diameter portion 124 that forms an outer groove 126 in an inner surface of the outer tubular member 102, and the inner tubular member 104 may comprise a reduced diameter portion 128 that forms an inner groove 130 in an outer surface of the inner tubular member 104. Accordingly, in some embodiments, a portion of the second annular leg portion (e.g., end 118, third open loop 122, etc.) may be received and/or restrainably attached within the outer groove 126, and a portion (e.g., end 112, first open loop 114, etc.) of the first annular leg portion 110 may be received and/or restrainably attached within the inner groove 130. Furthermore, in some particular embodiments, one or more additional restraining mechanisms, such as adhesive bonding, circlips, clips, fasteners, interference fit, other known restraining devices, or any combination thereof, may be used in conjunction with the grooves 126, 130.

In the embodiment shown, the annular seal 108 comprises a first open loop 114, a second open loop 120, and a third open loop 122. The first open loop 114 may generally terminate at the end 112 of the first annular leg portion 110, the second open loop 120 may be disposed between the first open loop 114 and the third open loop 122, and the third open loop 122 may terminate at the end 118 of the second annular leg portion 116. In other embodiments, the annular seal 108 may comprise one or more additional or fewer loops (e.g., 2 total loops, 3 total loops, 4 total loops, 5 total loops, etc.) in one or more of the annular leg portions 110, 116.

In some embodiments, the first open loop 114 and the second loop 120 may comprise opposing arcuate convolutions. However, in other embodiments, the first open loop 114 and the second loop 120 may comprise congruent arcuate convolutions. In some embodiments, the second open loop 120 and the third open loop 122 may comprise opposing arcuate convolutions. However, in other embodiments, the second open loop 120 and the third open loop 122 may congruent arcuate convolutions. Further, in some embodiments, the first open loop 114 and the third open loop 122 may comprise opposing arcuate convolutions. However, in other embodiments, the first open loop 114 and the third open loop 122 may comprise congruent arcuate convolutions.

In some embodiments, the first open loop 114 may extend from the end 112 of the first annular leg portion 110 and extend axially along a first axial direction (e.g., generally upward in FIG. 1) and curve to extend axially along a second axial direction (e.g., generally downward in FIG. 1) that is opposite the first axial direction. In some embodiments, the first open loop 114 may extend axially along the second axial direction past the end 112 of the first annular leg portion 110. However, in other embodiments, the first open loop 114 may not extend axially along the second axial direction past the end 112 of the first annular leg portion 110.

In some embodiments, the second open loop 120 may extend from the first open loop 114 of the first annular leg portion 110 and extend axially along the second axial direction and curve to extend axially along the first direction. In some embodiments, the second open loop 120 may extend axially along the first axial direction past the end 112 of the first annular leg portion 110 and/or the end 118 of the second annular leg portion 116. However, in other embodiments, the second open loop 120 may not extend axially along the first axial direction past the end 112 of the first annular leg portion 110 or the end 118 of the second annular leg portion 116.

In some embodiments, the third open loop 122 may extend from the second open loop 120 of the second annular leg portion 116 and extend axially along the first axial direction and curve to extend axially along the second axial direction to the end 118 of the second annular leg portion 116. Alternatively said, the third open loop 122 may extend from the end 118 of the second annular leg portion 116 axially in the first direction and curve to extend along the second axial direction to the second open loop 120. In some embodiments, the third open loop 122 may extend axially along the second axial direction past the end 118 of the second annular leg portion 116. However, in other embodiments, the third open loop 122 may not extend axially along the second axial direction past the end 118 of the second annular leg portion 116.

Radius of Curvature

As shown in FIG. 1, the first open loop 114 may comprise a radius of curvature, r1, the second open loop 120 may comprise a radius of curvature, r2, and the third open loop 122 may comprise a radius of curvature, r3. In some embodiments, r1 may be greater than r3. In other embodiments, r1 may be equal to r3. However, in alternative embodiments, r1 may be less than r3. In some embodiments, r1 may be greater than or less than r3 by at least about 5%, such as at least 10%, at least 15%, at least 20%, at least 25%, at least 30%, at least 35%, at least 40%, at least 45%, at least 50%, at least 55% as at least 60%, at least 65%, at least 70%, at least 75%, at least 80%, at least 85%, at least 90%, at least 95%, at least 100%, at least 150%, at least 200%, at least 300%, at least 400%, at least 500%, at least 1000%, or at least about 2000%. In some embodiments, r1 may be greater than or less than r3 by not greater than about 2000%, not greater than 1000%, not greater than 500%, not greater than 400%, not greater than 300%, not greater than 200%, not greater than 100%, not greater than 95% of the plurality of fibers 104, such as not greater than 90%, not greater than 85%, not greater than 80%, not greater than 75%, not greater than 70%, not greater than 65%, not greater than 60%, not greater than 55%, not greater than 50%, not greater than 45%, not greater than 40%, not greater than 35%, not greater than 30%, not greater than 25%, not greater than 20%, not greater than 15%, not greater than 10%, or not greater than about 5%. Further, it will be appreciated that r1 may be greater than or less than r3 by between any of these minimum and maximum percentages, such as at least about 5% to not greater than about 2000%.

In some embodiments, r2 may be greater than r1 and/or r3. However, in some embodiments, r2 may be equal to r1 and/or r3. In some embodiments, r2 may be greater than r1 and/or r3 by at least about 5%, such as at least 10%, at least 15%, at least 20%, at least 25%, at least 30%, at least 35%, at least 40%, at least 45%, at least 50%, at least 55% as at least 60%, at least 65%, at least 70%, at least 75%, at least 80%, at least 85%, at least 90%, at least 95%, at least 100%, at least 150%, at least 200%, at least 300%, at least 400%, at least 500%, at least 1000%, or at least about 2000%. In some embodiments, r2 may be greater than r1 and/or r3 by not greater than about 2000%, not greater than 1000%, not greater than 500%, not greater than 400%, not greater than 300%, not greater than 200%, not greater than 100%, not greater than 95% of the plurality of fibers 104, such as not greater than 90%, not greater than 85%, not greater than 80%, not greater than 75%, not greater than 70%, not greater than 65%, not greater than 60%, not greater than 55%, not greater than 50%, not greater than 45%, not greater than 40%, not greater than 35%, not greater than 30%, not greater than 25%, not greater than 20%, not greater than 15%, not greater than 10%, or not greater than about 5%. Further, it will be appreciated that r2 may be greater than r1 and/or r3 by between any of these minimum and maximum percentages, such as at least about 5% to not greater than about 2000%.

Radial Width

As shown in FIG. 1, the first open loop 114 may comprise a radial width, w1, the second open loop 120 may comprise a radial width, w2, and the third open loop 122 may comprise a radial width, w3. In some embodiments, w1 may be greater than w3. In other embodiments, w1 may be equal to w3. However, in alternative embodiments, w1 may be less than w3. In some embodiments, w1 may be greater than or less than w3 by at least about 5%, such as at least 10%, at least 15%, at least 20%, at least 25%, at least 30%, at least 35%, at least 40%, at least 45%, at least 50%, at least 55% as at least 60%, at least 65%, at least 70%, at least 75%, at least 80%, at least 85%, at least 90%, at least 95%, at least 100%, at least 150%, at least 200%, at least 300%, at least 400%, at least 500%, at least 1000%, or at least about 2000%. In some embodiments, w1 may be greater than or less than w3 by not greater than about 2000%, not greater than 1000%, not greater than 500%, not greater than 400%, not greater than 300%, not greater than 200%, not greater than 100%, not greater than 95% of the plurality of fibers 104, such as not greater than 90%, not greater than 85%, not greater than 80%, not greater than 75%, not greater than 70%, not greater than 65%, not greater than 60%, not greater than 55%, not greater than 50%, not greater than 45%, not greater than 40%, not greater than 35%, not greater than 30%, not greater than 25%, not greater than 20%, not greater than 15%, not greater than 10%, or not greater than about 5%. Further, it will be appreciated that w1 may be greater than or less than w3 by between any of these minimum and maximum percentages, such as at least about 5% to not greater than about 2000%.

In some embodiments, w2 may be greater than w1 and/or w3. However, in some embodiments, w2 may be equal to w1 and/or w3. In some embodiments, w2 may be greater than w1 and/or w3 by at least about 5%, such as at least 10%, at least 15%, at least 20%, at least 25%, at least 30%, at least 35%, at least 40%, at least 45%, at least 50%, at least 55% as at least 60%, at least 65%, at least 70%, at least 75%, at least 80%, at least 85%, at least 90%, at least 95%, at least 100%, at least 150%, at least 200%, at least 300%, at least 400%, at least 500%, at least 1000%, or at least about 2000%. In some embodiments, w2 may be greater than w1 and/or w3 by not greater than about 2000%, not greater than 1000%, not greater than 500%, not greater than 400%, not greater than 300%, not greater than 200%, not greater than 100%, not greater than 95% of the plurality of fibers 104, such as not greater than 90%, not greater than 85%, not greater than 80%, not greater than 75%, not greater than 70%, not greater than 65%, not greater than 60%, not greater than 55%, not greater than 50%, not greater than 45%, not greater than 40%, not greater than 35%, not greater than 30%, not greater than 25%, not greater than 20%, not greater than 15%, not greater than 10%, or not greater than about 5%. Further, it will be appreciated that w2 may be greater than w1 and/or w3 by between any of these minimum and maximum percentages, such as at least about 5% to not greater than about 2000%.

The first open loop 114, the second open loop 120, and the third open loop 122 may at least partially span a radial width of the annulus 106. In some embodiments, the first open loop 114 may span the radial width of the annulus 106 by at least about 10%, such as at least about 15%, at least 20%, at least 25%, at least 30%, at least 35%, at least 40%, at least 45%, or at least about 50%. In some embodiments, the first open loop 114 may span the radial width of the annulus 106 by not greater than 70%, such as not greater than 60%, not greater than 50%, not greater than 40%, not greater than 30%, or not greater than about 20%. Further, it will be appreciated that the first open loop 114 may span the radial width of the annulus 106 by between any of these minimum and maximum percentages, such as at least about 10% to not greater than about 70%.

In some embodiments, the second open loop 120 may span the radial width of the annulus 106 by at least about 50%, such as at least about 55%, at least 60%, at least 65%, at least 70%, at least 75%, at least 80%, at least 85%, at least 90%, or at least about 95%. In some embodiments, the second open loop 120 may span the radial width of the annulus 106 by not greater than 95%, such as not greater than 90%, not greater than 85%, not greater than 80%, not greater than 75%, not greater than 70%, not greater than 65%, or not greater than about 60%. Further, it will be appreciated that the second open loop 120 may span the radial width of the annulus 106 by between any of these minimum and maximum percentages, such as at least about 50% to not greater than about 95%.

In some embodiments, the third open loop 122 may span the radial width of the annulus 106 by at least about 10%, such as at least about 15%, at least 20%, at least 25%, at least 30%, at least 35%, at least 40%, at least 45%, or at least about 50%. In some embodiments, the third open loop 122 may span the radial width of the annulus 106 by not greater than 70%, such as not greater than 60%, not greater than 50%, not greater than 40%, not greater than 30%, or not greater than about 20%. Further, it will be appreciated that the third open loop 122 may span the radial width of the annulus 106 by between any of these minimum and maximum percentages, such as at least about 10% to not greater than about 70%.

Further, in some embodiments, the first open loop 114 and the second open loop 120 may collectively span the radial width of the annulus 106 by at least about 60%, such as at least about 65%, at least 70%, at least 75%, at least 80%, at least 85%, at least 90%, or at least about 95%. In some embodiments, the first open loop 114 and the second open loop 120 may collectively span the radial width of the annulus 106 by not greater than 95%, such as not greater than 90%, not greater than 85%, not greater than 80%, not greater than 75%, not greater than 70%, not greater than 65%, or not greater than about 60%. Further, it will be appreciated that the first open loop 114 and the second open loop 120 may collectively span the radial width of the annulus 106 by between any of these minimum and maximum percentages, such as at least about 60% to not greater than about 95%.

Still further, in some embodiments, the second open loop 120 and the third open loop 122 may collectively span the radial width of the annulus 106 by at least about 60%, such as at least about 65%, at least 70%, at least 75%, at least 80%, at least 85%, at least 90%, or at least about 95%. In some embodiments, the second open loop 120 and the third open loop 122 may collectively span the radial width of the annulus 106 by not greater than 95%, such as not greater than 90%, not greater than 85%, not greater than 80%, not greater than 75%, not greater than 70%, not greater than 65%, or not greater than about 60%. Further, it will be appreciated that the second open loop 120 and the third open loop 122 may collectively span the radial width of the annulus 106 by between any of these minimum and maximum percentages, such as at least about 60% to not greater than about 95%.

ARC

In some embodiments, the first open loop 114 may form a curved portion that spans an arc of at least about 90 degrees, such as at least 135 degrees, or at least about 180 degrees. In some embodiments, the first open loop 114 may form a curved portion that spans an arc of not greater than 270 degrees, such as not greater than 225 degrees, or not greater than about 180 degrees. Further, it will be appreciated that the first open loop 114 may form a curved portion that spans an arc between any of these minimum and maximum percentages, such as at least about 90 degrees to not greater than about 270 degrees.

In some embodiments, the second open loop 120 may form a curved portion that spans an arc of at least about 90 degrees, such as at least 135 degrees, or at least about 180 degrees. In some embodiments, the second open loop 120 may form a curved portion that spans an arc of not greater than 270 degrees, such as not greater than 225 degrees, or not greater than about 180 degrees. Further, it will be appreciated that the second open loop 120 may form a curved portion that spans an arc between any of these minimum and maximum percentages, such as at least about 90 degrees to not greater than about 270 degrees.

In some embodiments, the third open loop 122 may form a curved portion that spans an arc of at least about 90 degrees, such as at least 135 degrees, or at least about 180 degrees. In some embodiments, the third open loop 122 may form a curved portion that spans an arc of not greater than 270 degrees, such as not greater than 225 degrees, or not greater than about 180 degrees. Further, it will be appreciated that the third open loop 122 may form a curved portion that spans an arc between any of these minimum and maximum percentages, such as at least about 90 degrees to not greater than about 270 degrees.

Figure 2:
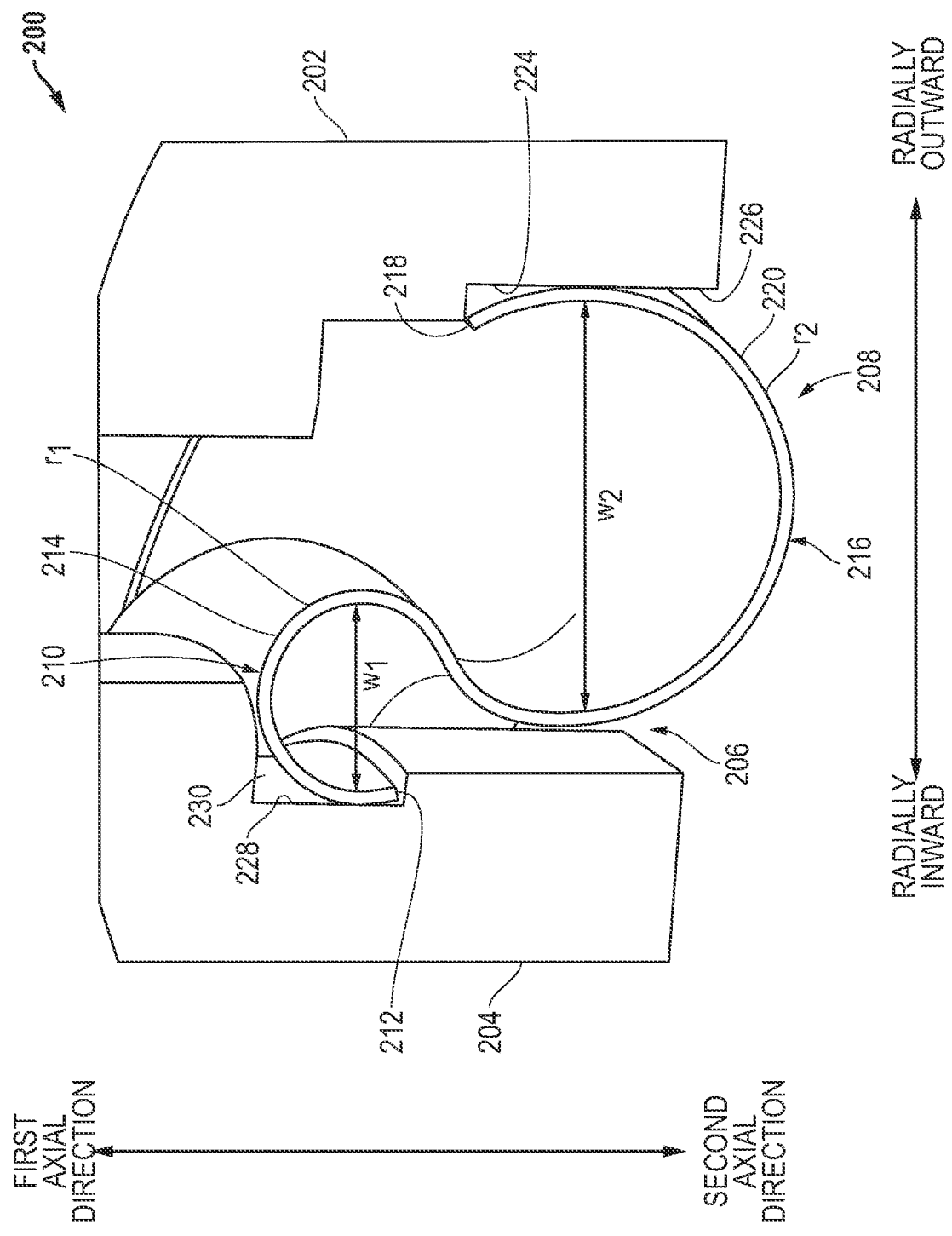
FIG. 2 is a cross-sectional view of a seal assembly according to an embodiment of the disclosure.

FIG. 2 shows a cross-sectional view of a seal assembly 200 according to another embodiment of the disclosure. The seal assembly 200 may generally comprise an outer tubular member 202 having an inner diameter and an inner tubular member 204 having an outer diameter and disposed within the outer tubular member 202, such that the inner diameter of the outer tubular member 202 and the outer diameter of the inner tubular member 204 form an annulus 206 therebetween. The seal assembly 200 may also comprise an annular seal 208 disposed between the outer tubular member 202 and the inner tubular member 204 to seal the annulus 206. As such, in some embodiments, the annular seal 208 may be substantially resilient to permit relative movement between the outer tubular member 202 and the inner tubular member 204 caused by thermal, mechanical, and/or vibrational forces while maintaining a fluid tight seal within the annulus 206.

In the embodiment shown, the annular seal 208 may generally comprise an S-shaped cross section comprising two opposing arcuate convolutions. The annular seal 208 may generally comprise a first annular leg portion 210 that terminates at an end 212. In some embodiments, the first annular leg portion 210 may comprise a first open loop 214. Depending on the configuration of the annular seal 208, the end 212 of the first annular leg portion 210 may be disposed radially inward or outward with respect to the annulus 206. The annular seal 208 may also comprise a second annular leg portion 216 that extends from the first annular leg portion 210 and terminates at an end 218. In some embodiments, the second annular leg portion may comprise a second open loop 220. However, as opposed to annular seal 108, annular seal 208 does not comprise the third open loop 122.

Depending on the configuration of the annular seal 208, the end 218 of the second annular leg portion 216 may be disposed radially inward or outward with respect to the annulus 206 and opposite of the end 212. Accordingly, when the end 212 of the first annular leg portion 210 is radially inward, the end 218 of the second annular leg portion 216 is radially outward, and vice versa. In some embodiments, end 212 of the first annular leg portion 210 may be restrainably attached to the outer tubular member 202 or the inner tubular member 204. Additionally, in some embodiments, the end 218 of the second annular leg portion 216 may be restrainably attached to the other of the outer tubular member 202 and the inner tubular member 204. Thus, in some embodiments, the ends 212, 218 may be restrainably attached to annular leg portions 210, 216 via adhesive bonding, circlips, clips, fasteners, interference fit, other known restraining devices, or any combination thereof.

In some embodiments, the outer tubular member 202 may comprise a substantially constant inner diameter. In some embodiments, the inner tubular member 204 may comprise a substantially constant outer diameter. However, in some embodiments, the outer tubular member 202 and/or the inner tubular member 204 may comprise features that restrainably attach, locate, and/or receive portions of the annular seal 208 with respect to the outer tubular member 202, inner tubular member 204, the annulus 206, or combinations thereof. For example, in the embodiment shown, the outer tubular member 202 may comprise an increased diameter portion 224 that forms an outer groove 226 in an inner surface of the outer tubular member 202, and the inner tubular member 204 may comprise a reduced diameter portion 228 that forms an inner groove 230 in an outer surface of the inner tubular member 204. Accordingly, in some embodiments, a portion (e.g., end 218, etc.) of the second annular leg portion 216 may be received and/or restrainably attached within the outer groove 226, and a portion (e.g., end 212, etc.) of the first annular leg portion 210 may be received and/or restrainably attached within the inner groove 230. Furthermore, in some particular embodiments, one or more additional restraining mechanisms, such as adhesive bonding, circlips, clips, fasteners, interference fit, other known restraining devices, or any combination thereof, may be used in conjunction with the grooves 226, 230.

In the embodiment shown, the annular seal 208 comprises a first open loop 214 and a second open loop 220. The first open loop 214 may generally terminate at the end 212 of the first annular leg portion 210, and the second open loop 220 may terminate at the end 218 of the second annular leg portion 216. In other embodiments, the annular seal 208 may comprise one or more additional loops (e.g., 3 total loops, 4 total loops, 5 total loops, etc.) in one or more of the annular leg portions 210, 216.

In some embodiments, the first open loop 214 and the second loop 220 may comprise opposing arcuate convolutions. However, in other embodiments, the first open loop 214 and the second loop 220 may comprise congruent arcuate convolutions. In some embodiments, the first open loop 214 may extend from the end 212 of the first annular leg portion 210 and extend axially along a first axial direction (e.g., generally upward in FIG. 2) and curve to extend axially along a second axial direction (e.g., generally downward in FIG. 2) that is opposite the first axial direction. In some embodiments, the first open loop 214 may extend axially along the second axial direction past the end 212 of the first annular leg portion 210. However, in other embodiments, the first open loop 214 may not extend axially along the second axial direction past the end 212 of the first annular leg portion 210.

In some embodiments, the second open loop 220 may extend from the first open loop 214 of the first annular leg portion 210 and extend axially along the second axial direction and curve to extend axially along the first direction. Alternatively said, the second open loop 220 may extend from the end 218 of the second annular leg portion 216 axially in the first direction and curve to extend along the second axial direction to the first open loop 214. In some embodiments, the second open loop 220 may extend axially along the first axial direction past the end 212 of the first annular leg portion 210 and/or the end 218 of the second annular leg portion 216. However, in other embodiments, the second open loop 220 may not extend axially along the first axial direction past the end 212 of the first annular leg portion 210 or the end 218 of the second annular leg portion 216.

Radius of Curvature

As shown in FIG. 2, the first open loop 214 may comprise a radius of curvature, r1, and the second open loop 220 may comprise a radius of curvature, r2. In some embodiments, r1 may be greater than r2. In other embodiments, r1 may be equal to r2. However, in alternative embodiments, r1 may be less than r2. In some embodiments, r1 may be greater than or less than r2 by at least about 5%, such as at least 10%, at least 15%, at least 20%, at least 25%, at least 30%, at least 35%, at least 40%, at least 45%, at least 50%, at least 55% as at least 60%, at least 65%, at least 70%, at least 75%, at least 80%, at least 85%, at least 90%, at least 95%, at least 100%, at least 150%, at least 200%, at least 300%, at least 400%, at least 500%, at least 1000%, or at least about 2000%. In some embodiments, r1 may be greater than or less than r2 by not greater than about 2000%, not greater than 1000%, not greater than 500%, not greater than 400%, not greater than 300%, not greater than 200%, not greater than 100%, not greater than 95% of the plurality of fibers 104, such as not greater than 90%, not greater than 85%, not greater than 80%, not greater than 75%, not greater than 70%, not greater than 65%, not greater than 60%, not greater than 55%, not greater than 50%, not greater than 45%, not greater than 40%, not greater than 35%, not greater than 30%, not greater than 25%, not greater than 20%, not greater than 15%, not greater than 10%, or not greater than about 5%. Further, it will be appreciated that r1 may be greater than or less than r2 by between any of these minimum and maximum percentages, such as at least about 5% to not greater than about 2000%.

Radial Width

A shown in FIG. 2, the first open loop 214 may comprise a radial width, w1, and the second open loop 220 may comprise a radial width, w2. In some embodiments, w1 may be greater than w2. In other embodiments, w1 may be equal to w2. However, in alternative embodiments, w1 may be less than w2. In some embodiments, w1 may be greater than or less than w2 by at least about 5%, such as at least 10%, at least 15%, at least 20%, at least 25%, at least 30%, at least 35%, at least 40%, at least 45%, at least 50%, at least 55% as at least 60%, at least 65%, at least 70%, at least 75%, at least 80%, at least 85%, at least 90%, at least 95%, at least 100%, at least 150%, at least 200%, at least 300%, at least 400%, at least 500%, at least 1000%, or at least about 2000%. In some embodiments, w1 may be greater than or less than w2 by not greater than about 2000%, not greater than 1000%, not greater than 500%, not greater than 400%, not greater than 300%, not greater than 200%, not greater than 100%, not greater than 95% of the plurality of fibers 104, such as not greater than 90%, not greater than 85%, not greater than 80%, not greater than 75%, not greater than 70%, not greater than 65%, not greater than 60%, not greater than 55%, not greater than 50%, not greater than 45%, not greater than 40%, not greater than 35%, not greater than 30%, not greater than 25%, not greater than 20%, not greater than 15%, not greater than 10%, or not greater than about 5%. Further, it will be appreciated that w1 may be greater than or less than w2 by between any of these minimum and maximum percentages, such as at least about 5% to not greater than about 2000%.

The first open loop 214 and the second open loop 220 may at least partially span a radial width of the annulus 206. In some embodiments, the first open loop 214 may span the radial width of the annulus 206 by at least about 10%, such as at least about 15%, at least 20%, at least 25%, at least 30%, at least 35%, at least 40%, at least 45%, at least about 50%, at least about 60%, at least about 70%, at least about 80%, or at least about 90%. In some embodiments, the first open loop 214 may span the radial width of the annulus 206 by not greater than 90%, such as not greater than 80%, not greater than 70%, not greater than 60%, not greater than 50%, not greater than 40%, not greater than 30%, or not greater than about 20%. Further, it will be appreciated that the first open loop 214 may span the radial width of the annulus 206 by between any of these minimum and maximum percentages, such as at least about 10% to not greater than about 90%.

In some embodiments, the second open loop 220 may span the radial width of the annulus 206 by at least about 10%, such as at least about 15%, at least 20%, at least 25%, at least 30%, at least 35%, at least 40%, at least 45%, at least about 50%, at least about 60%, at least about 70%, at least about 80%, or at least about 90%. In some embodiments, the second open loop 220 may span the radial width of the annulus 206 by not greater than 90%, such as not greater than 80%, not greater than 70%, not greater than 60%, not greater than 50%, not greater than 40%, not greater than 30%, or not greater than about 20%. Further, it will be appreciated that the second open loop 220 may span the radial width of the annulus 206 by between any of these minimum and maximum percentages, such as at least about 10% to not greater than about 90%.

ARC

In some embodiments, the first open loop 214 may form a curved portion that spans an arc of at least about 90 degrees, such as at least 135 degrees, or at least about 180 degrees. In some embodiments, the first open loop 214 may form a curved portion that spans an arc of not greater than 270 degrees, such as not greater than 225 degrees, or not greater than about 180 degrees. Further, it will be appreciated that the first open loop 214 may form a curved portion that spans an arc between any of these minimum and maximum percentages, such as at least about 90 degrees to not greater than about 270 degrees.

In some embodiments, the second open loop 220 may form a curved portion that spans an arc of at least about 90 degrees, such as at least 135 degrees, or at least about 180 degrees. In some embodiments, the second open loop 220 may form a curved portion that spans an arc of not greater than 270 degrees, such as not greater than 225 degrees, or not greater than about 180 degrees. Further, it will be appreciated that the second open loop 220 may form a curved portion that spans an arc between any of these minimum and maximum percentages, such as at least about 90 degrees to not greater than about 270 degrees.

Figure 3:
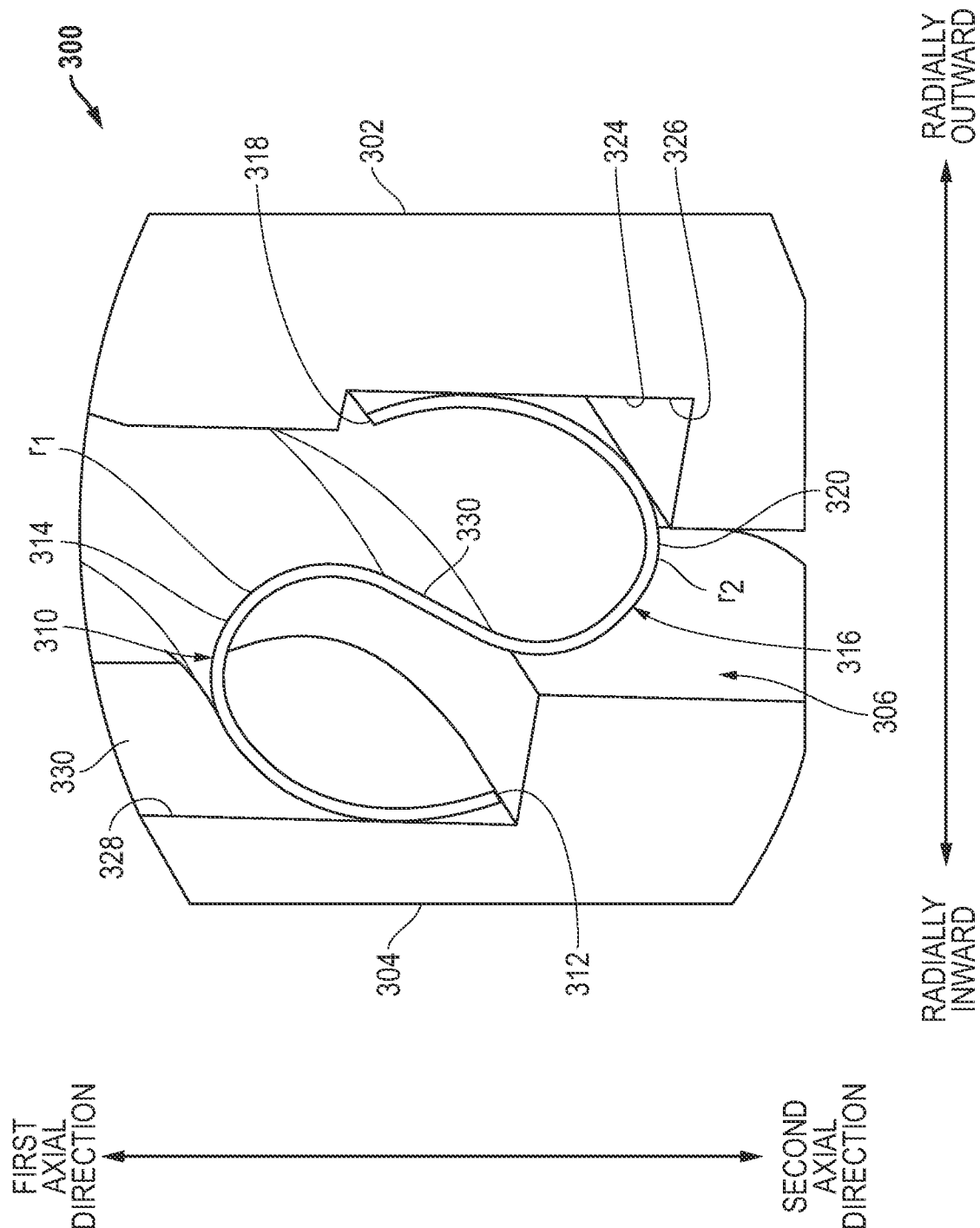
FIG. 3 is a cross-sectional view of a seal assembly according to an embodiment of the disclosure.

FIG. 3 is a cross-sectional view of a seal assembly 300 according to another alternative embodiment of the disclosure. The seal assembly 300 may generally comprise an outer tubular member 302 having an inner diameter and an inner tubular member 304 having an outer diameter and disposed within the outer tubular member 302, such that the inner diameter of the outer tubular member 302 and the outer diameter of the inner tubular member 304 form an annulus 306 therebetween. The seal assembly 300 may also comprise an annular seal 308 disposed between the outer tubular member 302 and the inner tubular member 304 to seal the annulus 306. As such, in some embodiments, the annular seal 308 may be substantially resilient to permit relative movement between the outer tubular member 302 and the inner tubular member 304 caused by thermal, mechanical, and/or vibrational forces while maintaining a fluid tight seal within the annulus 306.

In the embodiment shown, the annular seal 308 may generally comprise an S-shaped cross section comprising two opposing arcuate convolutions. The annular seal 308 may generally comprise a first annular leg portion 310 that terminates at an end 312. In some embodiments, the first annular leg portion 310 may comprise a first open loop 314. Depending on the configuration of the annular seal 308, the end 312 of the first annular leg portion 310 may be disposed radially inward or outward with respect to the annulus 306. The annular seal 308 may also comprise a second annular leg portion 316 that terminates at an end 318. In some embodiments, the second annular leg portion may comprise a second open loop 320. In some embodiments, the annular seal 308 may also comprise a center portion 330 disposed between the first annular leg portion 310 and the second annular leg portion 316. More specifically, the center leg portion 330 may be disposed between the first open loop 314 and the second open loop 320. In some embodiments, the center portion 330 may comprise an inflection point. In other embodiments, the center portion 330 may comprise a substantially linear portion. In yet other embodiments, the center portion 330 may be curved or comprise any alternative shape.

Depending on the configuration of the annular seal 308, the end 318 of the second annular leg portion 316 may be disposed radially inward or outward with respect to the annulus 306 and opposite of the end 312. Accordingly, when the end 312 of the first annular leg portion 310 is radially inward, the end 318 of the second annular leg portion 316 is radially outward, and vice versa. In some embodiments, end 312 of the first annular leg portion 310 may be restrainably attached to the outer tubular member 302 or the inner tubular member 304. Additionally, in some embodiments, the end 318 of the second annular leg portion 316 may be restrainably attached to the other of the outer tubular member 302 and the inner tubular member 304. Thus, in some embodiments, the ends 312, 318 may be restrainably attached to annular leg portions 310, 316 via adhesive bonding, circlips, clips, fasteners, interference fit, other known restraining devices, or any combination thereof.

In some embodiments, the outer tubular member 302 may comprise a substantially constant inner diameter. In some embodiments, the inner tubular member 304 may comprise a substantially constant outer diameter. However, in some embodiments, the outer tubular member 302 and/or the inner tubular member 304 may comprise features that restrainably attach, locate, and/or receive portions of the annular seal 308 with respect to the outer tubular member 302, inner tubular member 304, the annulus 306, or combinations thereof. For example, in the embodiment shown, the outer tubular member 302 may comprise an increased diameter portion 324 that forms an outer groove 326 in an inner surface of the outer tubular member 302, and the inner tubular member 304 may comprise a reduced diameter portion 328 that forms an inner groove 330 in an outer surface of the inner tubular member 304. Accordingly, in some embodiments, a portion (e.g., end 318, etc.) of the second annular leg portion 316 may be received and/or restrainably attached within the outer groove 326, and a portion (e.g., end 312) of the first annular leg portion 310 may be received and/or restrainably attached within the inner groove 330. Furthermore, in some particular embodiments, one or more additional restraining mechanisms, such as adhesive bonding, circlips, clips, fasteners, interference fit, other known restraining devices, or any combination thereof, may be used in conjunction with the grooves 326, 330.

In the embodiment shown, the annular seal 308 comprises a first open loop 314 and a second open loop 320. The first open loop 314 may generally terminate at the end 312 of the first annular leg portion 310, and the second open loop 320 may terminate at the end 318 of the second annular leg portion 316. In other embodiments, the annular seal 308 may comprise one or more additional loops (e.g., 3 total loops, 4 total loops, 5 total loops, etc.) in one or more of the annular leg portions 310, 316.

In some embodiments, the first open loop 314 and the second loop 320 may comprise opposing arcuate convolutions. However, in other embodiments, the first open loop 314 and the second loop 320 may comprise congruent arcuate convolutions. In some embodiments, the first open loop 314 may extend from the end 312 of the first annular leg portion 310 and extend axially along a first axial direction (e.g., generally upward in FIG. 3) and curve to extend axially along a second axial direction (e.g., generally downward in FIG. 3) that is opposite the first axial direction. In some embodiments, the first open loop 314 may extend axially along the second axial direction past the end 312 of the first annular leg portion 310. However, in other embodiments, the first open loop 314 may not extend axially along the second axial direction past the end 312 of the first annular leg portion 310.

In some embodiments, the second open loop 320 may extend from the first open loop 314 of the first annular leg portion 310 and extend axially along the second axial direction and curve to extend axially along the first direction. Alternatively said, the second open loop 320 may extend from the end 318 of the second annular leg portion 316 axially in the first direction and curve to extend along the second axial direction to the first open loop 314. In some embodiments, the second open loop 320 may extend axially along the first axial direction past the end 312 of the first annular leg portion 310 and/or the end 318 of the second annular leg portion 316. However, in other embodiments, the second open loop 320 may not extend axially along the first axial direction past the end 312 of the first annular leg portion 310 or the end 318 of the second annular leg portion 316.

Radius of Curvature

As shown in FIG. 3, the first open loop 314 may comprise a radius of curvature, r1, and the second open loop 320 may comprise a radius of curvature, r2. In some embodiments, the first annular leg portion 310 and the second annular leg portion 316 may comprise substantially constant radii of curvature. However, in other embodiments, the first annular leg portion 310 and the second annular leg portion 316 may be substantially parabolic and/or each have varying radii. Accordingly, in some embodiments, the radii of curvature, r1 and r2, may be defined as the radii of a best first circle within the first annular leg portion 310 (i.e., first open loop 314) and the second annular leg portion 316 (i.e., second open loop 320).

In some embodiments, r1 may be greater than r2. In other embodiments, r1 may be equal to r2. However, in alternative embodiments, r1 may be less than r2. In some embodiments, r1 may be greater than or less than r2 by at least about 5%, such as at least 10%, at least 15%, at least 20%, at least 25%, at least 30%, at least 35%, at least 40%, at least 45%, at least 50%, at least 55% as at least 60%, at least 65%, at least 70%, at least 75%, at least 80%, at least 85%, at least 90%, at least 95%, at least 100%, at least 150%, at least 200%, at least 300%, at least 400%, at least 500%, at least 1000%, or at least about 2000%. In some embodiments, r1 may be greater than or less than r2 by not greater than about 2000%, not greater than 1000%, not greater than 500%, not greater than 400%, not greater than 300%, not greater than 200%, not greater than 100%, not greater than 95% of the plurality of fibers 104, such as not greater than 90%, not greater than 85%, not greater than 80%, not greater than 75%, not greater than 70%, not greater than 65%, not greater than 60%, not greater than 55%, not greater than 50%, not greater than 45%, not greater than 40%, not greater than 35%, not greater than 30%, not greater than 25%, not greater than 20%, not greater than 15%, not greater than 10%, or not greater than about 5%. Further, it will be appreciated that r1 may be greater than or less than r2 by between any of these minimum and maximum percentages, such as at least about 5% to not greater than about 2000%.

Radial Width

A shown in FIG. 3, the first open loop 314 may comprise a radial width, w1, and the second open loop 320 may comprise a radial width, w2. In some embodiments, w1 may be greater than w2. In other embodiments, w1 may be equal to w2. However, in alternative embodiments, w1 may be less than w2. In some embodiments, w1 may be greater than or less than w2 by at least about 5%, such as at least 10%, at least 15%, at least 20%, at least 25%, at least 30%, at least 35%, at least 40%, at least 45%, at least 50%, at least 55% as at least 60%, at least 65%, at least 70%, at least 75%, at least 80%, at least 85%, at least 90%, at least 95%, at least 100%, at least 150%, at least 200%, at least 300%, at least 400%, at least 500%, at least 1000%, or at least about 2000%. In some embodiments, w1 may be greater than or less than w2 by not greater than about 2000%, not greater than 1000%, not greater than 500%, not greater than 400%, not greater than 300%, not greater than 200%, not greater than 100%, not greater than 95% of the plurality of fibers 104, such as not greater than 90%, not greater than 85%, not greater than 80%, not greater than 75%, not greater than 70%, not greater than 65%, not greater than 60%, not greater than 55%, not greater than 50%, not greater than 45%, not greater than 40%, not greater than 35%, not greater than 30%, not greater than 25%, not greater than 20%, not greater than 15%, not greater than 10%, or not greater than about 5%. Further, it will be appreciated that w1 may be greater than or less than w2 by between any of these minimum and maximum percentages, such as at least about 5% to not greater than about 2000%.

The first open loop 314 and the second open loop 320 may at least partially span a radial width of the annulus 306. In some embodiments, the first open loop 314 may span the radial width of the annulus 306 by at least about 10%, such as at least about 15%, at least 20%, at least 25%, at least 30%, at least 35%, at least 40%, at least 45%, at least about 50%, at least about 60%, at least about 70%, at least about 80%, or at least about 90%. In some embodiments, the first open loop 314 may span the radial width of the annulus 306 by not greater than 90%, such as not greater than 80%, not greater than 70%, not greater than 60%, not greater than 50%, not greater than 40%, not greater than 30%, or not greater than about 20%. Further, it will be appreciated that the first open loop 314 may span the radial width of the annulus 306 by between any of these minimum and maximum percentages, such as at least about 10% to not greater than about 90%.

In some embodiments, the second open loop 320 may span the radial width of the annulus 306 by at least about 10%, such as at least about 15%, at least 20%, at least 25%, at least 30%, at least 35%, at least 40%, at least 45%, at least about 50%, at least about 60%, at least about 70%, at least about 80%, or at least about 90%. In some embodiments, the second open loop 320 may span the radial width of the annulus 306 by not greater than 90%, such as not greater than 80%, not greater than 70%, not greater than 60%, not greater than 50%, not greater than 40%, not greater than 30%, or not greater than about 20%. Further, it will be appreciated that the second open loop 320 may span the radial width of the annulus 306 by between any of these minimum and maximum percentages, such as at least about 10% to not greater than about 90%.

ARC

In some embodiments, the first open loop 314 may form a curved portion that spans an arc of at least about 90 degrees, such as at least 135 degrees, or at least about 180 degrees. In some embodiments, the first open loop 314 may form a curved portion that spans an arc of not greater than 270 degrees, such as not greater than 225 degrees, or not greater than about 180 degrees. Further, it will be appreciated that the first open loop 314 may form a curved portion that spans an arc between any of these minimum and maximum percentages, such as at least about 90 degrees to not greater than about 270 degrees.

In some embodiments, the second open loop 320 may form a curved portion that spans an arc of at least about 90 degrees, such as at least 135 degrees, or at least about 180 degrees. In some embodiments, the second open loop 320 may form a curved portion that spans an arc of not greater than 270 degrees, such as not greater than 225 degrees, or not greater than about 180 degrees. Further, it will be appreciated that the second open loop 320 may form a curved portion that spans an arc between any of these minimum and maximum percentages, such as at least about 90 degrees to not greater than about 270 degrees.

Figure 4:
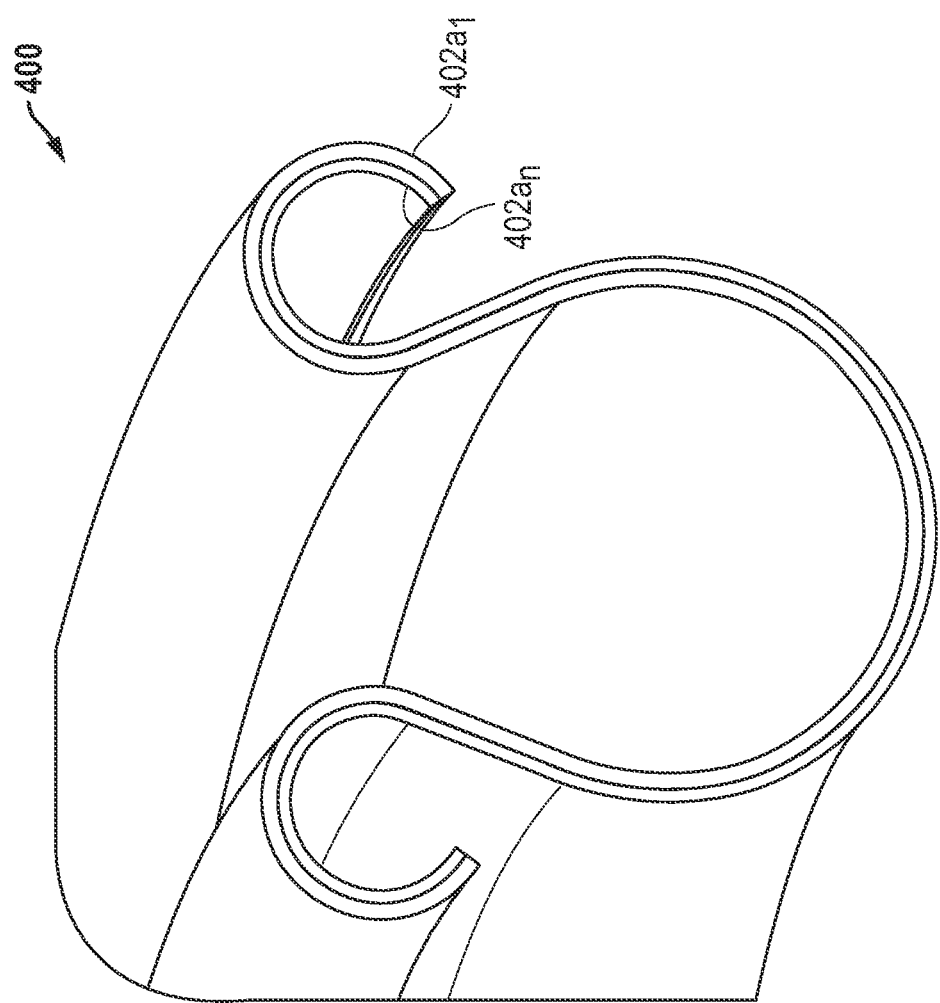
FIG. 4 is a cross-sectional view of an annular seal according to another embodiment of the disclosure.

FIG. 4 is a cross-sectional view of an annular seal 400 according to another embodiment of the disclosure. Seal assembly 400 generally comprises a plurality of layers or plies 402 of material beginning with a first ply $402a_1$ and ending with the final ply $402a_n$, where "n" represents the total number of plies 402. It will be appreciated that any of annular seals 108, 208, 308 may have multiple plies 402 of material as shown with respect to annular seal 400. Accordingly, in some embodiments, an annular seal 108, 208, 308, 400 may be formed from a plurality of plies 402 of material. In some embodiments, the plurality of plies 402 of material may comprise the same material. However, in some embodiments, the plurality of plies 402 of material may comprises at least one different material. In some embodiments, the plurality of plies 402 of material may comprises a substantially similar thickness. However, in some embodiments, the plurality of plies 402 of material may comprise at least one ply 402 having a different thickness. Suitable materials for the plies 402 may include, for example, aluminum, Inconel, titanium, stainless steel, steel, other resilient metallic materials, or any combination thereof. Further, in other low temperature applications, other materials such as thermoplastic or thermoset polymers may be used.

Embodiments of an annular seal 108, 208, 308, 400 disclosed herein may generally be configured to allow reciprocating axial movement, radial or lateral offset, angular displacement, misalignment capability, or any combination thereof between the outer tubular member 102, 202, 302 and the inner tubular member 104, 204, 304 through unrolling of at least one of the first annular leg portion 110, 210, 310 and the second annular leg portion 116, 216, 316. Annular seals 108, 208, 308, 400 disclosed herein may be configured to allow reciprocating axial movement of at least about 3.175 millimeters for a seal diameter of at least 50 mm, at least 55 mm, at least 60 mm, or at least 65 mm, and a seal diameter of not greater than 100 mm, not greater than 90 mm, not greater than 80 mm, or not greater than 70 mm. Accordingly, due to the increased performance of the annular seals 108, 208, 308, 400 disclosed herein, the need for a protective wear coating between the annular seal 108, 208, 308, 400 and mating surfaces of the outer tubular member 102, 202, 302 and the inner tubular member 104, 204, 304 may be significantly reduced and/or altogether eliminated.

Embodiments of an annular seal 108, 208, 308, 400 disclosed herein may be used in automotive, commercial, or industrial machinery and/or vehicles. For example, in some embodiments, the outer tubular member 102, 202, 302 may comprise at least one of an exhaust component and an engine block, and the inner tubular member 104, 204, 304 may comprise at least one of an exhaust component, exhaust manifold, and an EGR valve.

Figure 5:
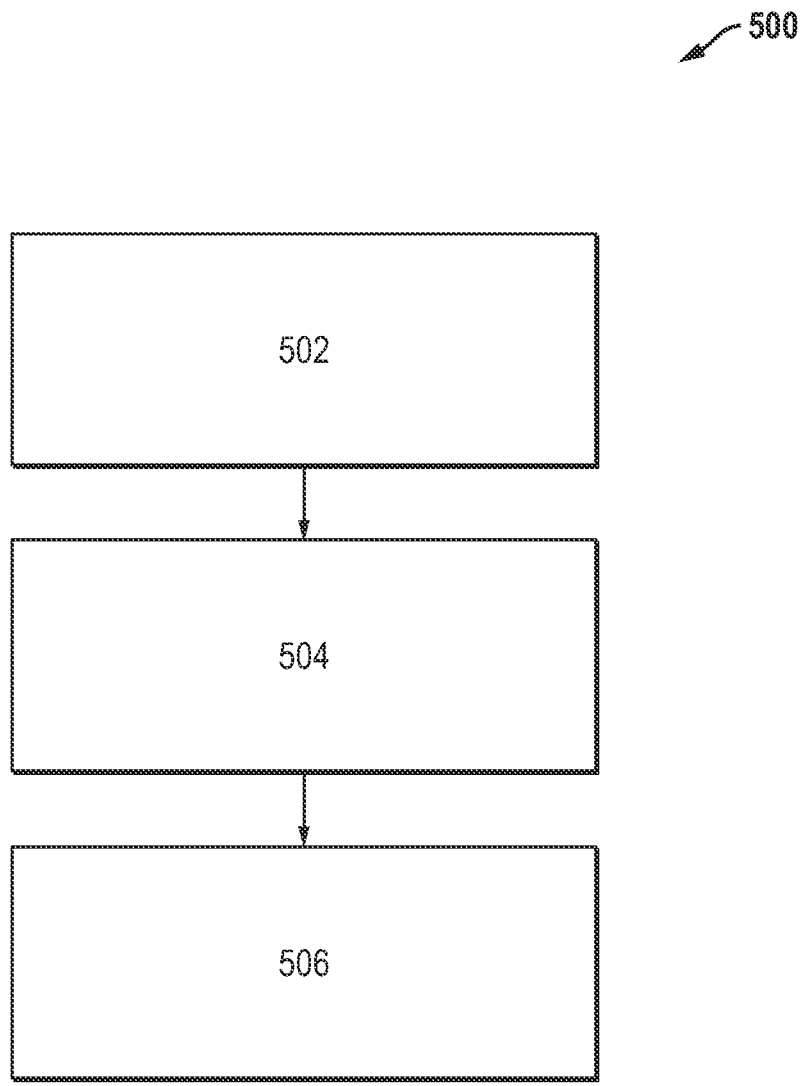
FIG. 5 is a flowchart of a method of forming a fluid tight seal in an annulus according to an embodiment of the disclosure.

FIG. 5 is a flowchart of a method 500 of forming a fluid tight seal in an annulus 106, 206, 306 according to an embodiment of the disclosure. Method 500 may begin at block 502 by disposing an annular seal 108, 208, 308, 400 in an annulus 106, 206, 306 formed between an outer tubular member 102, 202, 302 and an inner tubular member 104, 204, 304. Method 500 may continue at block 504 by applying a thermal, mechanical, vibrational, or other load to at least one of the outer tubular member 102, 202, 302 and the inner tubular member 104, 204, 304. Method 500 may continue at block 506 by maintaining a fluid tight seal with the annular seal 108, 208, 308, 400 within the annulus 106 during application of the thermal, mechanical, vibrational, or other load.

EXAMPLES

A traditional annular seal (C1) and an exemplary embodiment (S1) of an annular seal 308 were each installed in identical fixtures in an annulus formed between an inner tubular member and an outer tubular member. Pressure of 0.69 MPa (100 psi) was applied to each of the fixtures, and the inner tubular member was displaced radially until the annular seals began to lose contact with the outer tubular members. Each of C1 and S1 maintained contact pressure at a displacement of 0.07 mm. C1 began to lose contact pressure with the outer tubular member at a displacement of 0.08 mm, and the loss of contact pressure increased at a displacement of 0.09 mm. S1 maintained contact pressure at a displacement of 0.09 mm and began to lose contact pressure with the outer tubular member at a displacement of 0.12 mm. Thus, under similar conditions and displacement, S1 outperformed C1 in terms of maintaining contact pressure with the outer tubular member and is more resistant to displacement than C1.

Figure 6:
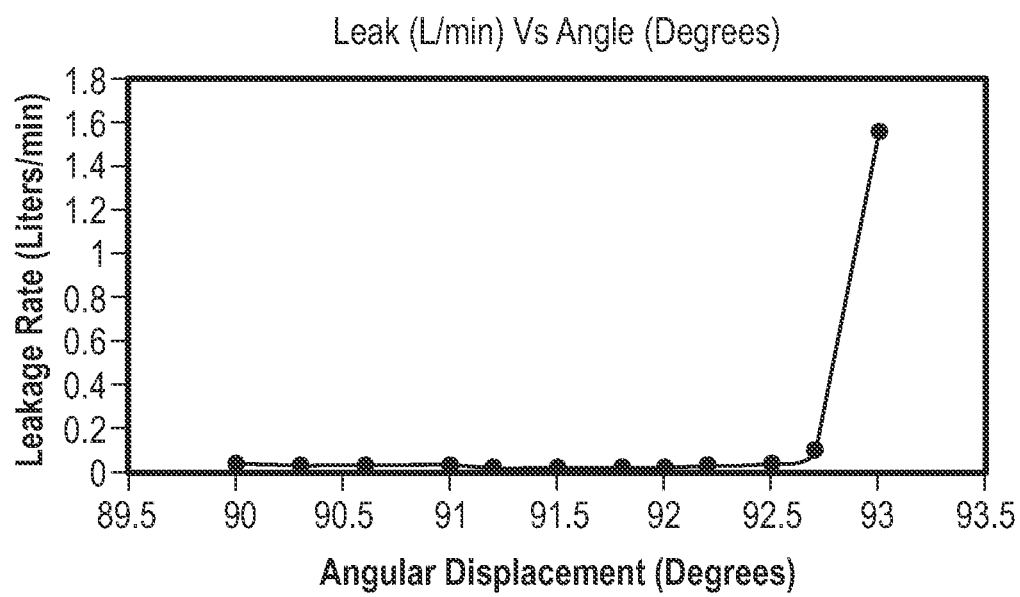
FIG. 6 is a graph of the leakage rate versus angular displacement of an exemplary embodiment of an annular seal.
Figure 7:
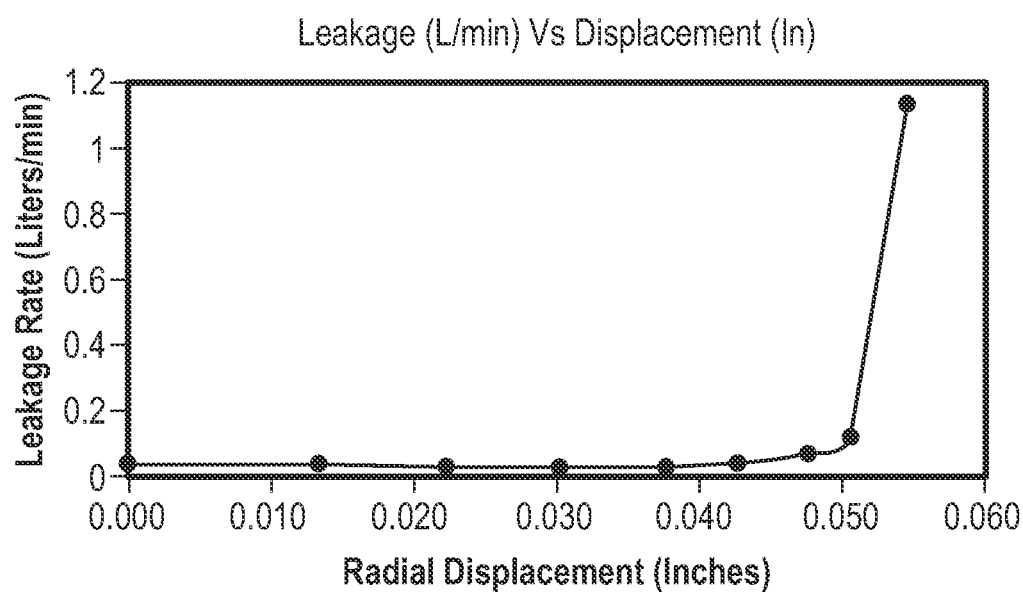
FIG. 7 is a graph of the leakage rate versus radial displacement of an exemplary embodiment of an annular seal.

Leak tests were conducted for an exemplary embodiment (S1) of an annular seal 308. The leakage rate was recorded versus angular displacement and radial displacement. FIG. 6 shows a graph of the leakage rate versus angular displacement of an exemplary embodiment of an annular seal 308. As shown, the exemplary embodiment of the annular seal 308 prevented leakage up to an angular displacement of at least about 92.75 degrees, which translates to an angular offset of at least about 2.75 degrees. FIG. 7 shows a graph of the leakage rate versus radial displacement of an exemplary embodiment of an annular seal 308. As shown, the exemplary embodiment of the annular seal 308 prevented leakage up to a radial displacement of at least about 0.0425 inches (at least about 1.08 mm). Other embodiments of the annular seal 108, 208, 400 may perform substantially similarly.

In still other embodiments, the seal assembly may include one or more of the following items:

Embodiment 1. A seal assembly, comprising: an outer tubular member having an inner diameter; an inner tubular member disposed within the outer tubular member and having an outer diameter, the inner diameter of the outer tubular member and the outer diameter of the inner tubular member forming an annulus therebetween; and an annular seal disposed between the outer tubular member and the inner tubular member to seal the annulus, the annular seal being resilient to permit relative movement between the outer tubular member and the inner tubular member, and the annular seal comprising in a radial cross-section: a first annular leg portion terminating at an end that is radially inward or radially outward, the first annular leg portion comprising a first open loop; and a second annular leg portion extending from the first annular leg portion and terminating at an end that is the other of radially inward or radially outward, the second annular leg portion comprising a second open loop.

Embodiment 2. The seal assembly of embodiment 1, wherein the end of the first annular leg portion is restrainably attached to at least one of the inner tubular member and the outer tubular member.

Embodiment 3. The seal assembly of embodiment 1, wherein the end of the second annular leg portion is restrainably attached to the other of the inner tubular member and the outer tubular member.

Embodiment 4. The seal assembly of embodiment 1, wherein the inner tubular member comprises a reduced diameter portion that forms an inner groove in an outer surface of the inner tubular member, and wherein the outer tubular member comprises an increased diameter portion that forms an outer groove in an inner surface of the outer tubular member.

Embodiment 5. The seal assembly of embodiment 3, wherein a portion of the first annular leg portion is received within the inner groove, and wherein a portion of the second annular leg portion is received within the outer groove.

Embodiment 6. The seal assembly of embodiment 4, wherein the end of the first annular leg portion is restrainably attached within the inner groove, and wherein the end of the second annular leg portion is restrainably attached within the outer groove.

Embodiment 7. The seal assembly of embodiment 1, wherein the first open loop and the second open loop comprise opposing arcuate convolutions.

Embodiment 8. The seal assembly of embodiment 1, wherein the end of the first annular leg portion is radially inward, and wherein the second annular leg portion is radially outward.

Embodiment 9. The seal assembly of embodiment 1, wherein the first open loop extends from the end of the first annular leg portion and extends axially along a first axial direction and curves to extend axially along a second axial direction that is opposite the first axial direction.

Embodiment 10. The seal assembly of embodiment 9, wherein the first open loop extends axially along the second axial direction past the end of the first annular leg portion.

Embodiment 11. The seal assembly of embodiment 9, wherein the second open loop extends from the end of the second annular leg portion and extends axially along the second axial direction and curves to extend axially along the first axial direction.

Embodiment 12. The seal assembly of embodiment 11, wherein the second open loop extends along the first axial direction axially past the end of the second annular leg portion.

Embodiment 13. The seal assembly of embodiment 1, wherein the first open loop and the second open loop at least partially span a radial width of the annulus.

Embodiment 14. The seal assembly of embodiment 13, wherein first open loop and the second open loop collectively span at least about 80% of radial width of the annulus.

Embodiment 15. The seal assembly of embodiment 13, wherein at least one of the first open loop and the second open loop spans at least about 50% of the radial width of annulus.

Embodiment 16. The seal assembly of embodiment 1, wherein the first open loop forms a curved portion that spans an arc of at least about 90 degrees.

Embodiment 17. The seal assembly of embodiment 16, wherein the second open loop forms a curved portion that spans an arc of greater than 90 degrees.

Embodiment 18. The seal assembly of embodiment 1, wherein the first open loop has radius of curvature r1, and wherein the second open loop has a radius of curvature, r2, and wherein r1 is less than r2.

Embodiment 19. The seal assembly of embodiment 1, wherein the first open loop has radius of curvature r1, and wherein the second open loop has a radius of curvature, r2, and wherein r1 is equal to r2.

Embodiment 20. The seal assembly of embodiment 1, wherein the annular seal comprises a center portion extending between the first annular leg portion and the second annular leg portion.

Embodiment 21. The seal assembly of embodiment 20, wherein the center portion is an inflection point.

Embodiment 22. The seal assembly of embodiment 20, wherein the center portion is substantially linear section.

Embodiment 23. The seal assembly of embodiment 1, wherein the second annular leg portion comprises a third open loop terminating at the end of the second annular leg portion.

Embodiment 24. The seal assembly of embodiment 23, wherein the third open loop extends from the end of the second annular leg portion axially in a first direction and curves to extend along a second axially direction past the end of the second annular leg portion.

Embodiment 25. The seal assembly of embodiment 23, wherein the second open loop has a radius of curvature, r2, and wherein the third open loop has radius of curvature, r3, and wherein r2 is greater than r3.

Embodiment 26. The seal assembly of embodiment 23, wherein the first open loop has radius of curvature r1, wherein the third open loop has radius of curvature, r3, and wherein r1 is greater than r3.

Embodiment 27. The seal assembly of embodiment 23, wherein the first open loop has radius of curvature r1, wherein the third open loop has radius of curvature, r3, and wherein r1 is equal to r3.

Embodiment 28. The seal assembly of embodiment 1, wherein the first open loop has a radial width, w1, wherein the second open loop has a radial width w2, and wherein w1 is less than w2.

Embodiment 29. The seal assembly of embodiment 1, wherein the first open loop has a radial width, w1, wherein the second open loop has a radial width w2, and wherein w1 is equal to w2.

Embodiment 30. The seal assembly of embodiment 23, wherein the first open loop has a radial width, w1, wherein the second open loop has a radial width w2, wherein the third open loop has a radial width, w3, and wherein w1 and w2 are greater than w3.

Embodiment 31. The seal assembly of embodiment 23, wherein the first open loop has a radial width, w1, wherein the second open loop has a radial width w2, wherein the third open loop has a radial width, w3, wherein w1 is equal to w3, and wherein w2 is greater than w1 and w3.

Embodiment 32. The seal assembly of embodiment 23, wherein the first open loop has a radial width, w1, wherein the second open loop has a radial width w2, wherein the third open loop has a radial width, w3, and wherein w1, w2, and w3 are equal.

Embodiment 33. The seal assembly of embodiment 1, wherein the annular seal is configured to allow reciprocating axial movement, radial or lateral offset, angular displacement, misalignment capability, or any combination thereof between the outer tubular member and the inner tubular member through unrolling of at least one of the first annular leg portion and the second annular leg portion.

Embodiment 34. The seal assembly of embodiment 33, wherein the annular seal is configured to allow reciprocating axial movement of at least about 3.175 millimeters for a seal diameter of at least 50 mm, at least 55 mm, at least 60 mm, or at least 65 mm, and a seal diameter of not greater than 100 mm, not greater than 90 mm, not greater than 80 mm, or not greater than 70 mm.

Embodiment 35. The seal assembly of embodiment 1, wherein the annular seal is formed from a plurality of plies of material.

Embodiment 36. The seal assembly of embodiment 35, wherein the plurality of plies of material comprises the same material.

Embodiment 37. The seal assembly of embodiment 35, wherein the plurality of plies of material comprises at least one different material.

Embodiment 38. The seal assembly of embodiment 35, wherein the plurality of plies of material comprises a substantially similar thickness.

Embodiment 39. The seal assembly of embodiment 35, wherein the plurality of plies of material comprises at least one ply having a different thickness.

Embodiment 40. The seal assembly of embodiment 1, wherein the annular seal eliminates the need for a protective wear coating between the annular seal and mating surfaces of the outer tubular member and the inner tubular member.

Embodiment 41. The seal assembly of embodiment 1, wherein the outer tubular member comprises at least one of an exhaust component and an engine block, and wherein the inner tubular member comprises at least one of an exhaust component, exhaust manifold, and an EGR valve.

Embodiment 42. A seal assembly, comprising: an outer tubular member having an inner diameter; an inner tubular member disposed within the outer tubular member and having an outer diameter, the inner diameter of the outer tubular member and the outer diameter of the inner tubular member forming an annulus therebetween; and an annular seal disposed between the outer tubular member and the inner tubular member to seal the annulus, the annular seal being resilient to permit relative movement between the outer tubular member and the inner tubular member, and the annular seal comprising in a radial cross-section: a first annular leg portion terminating at an end that is radially inward or radially outward, the first annular leg portion comprising a first open loop; and a second annular leg portion extending from the first annular leg portion and terminating at an end that is the other of radially inward or radially outward, the second annular leg portion comprising a second open loop; wherein the first open loop and the second open loop at least partially span a radial width of the annulus; and wherein the second open loop spans at least about 50%, at least about 60%, at least about 70%, at least about 80%, or at least about 90% of the radial width of the annulus.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A seal assembly, comprising:
   an outer tubular member having an inner diameter;
   an inner tubular member disposed within the outer tubular member and having an outer diameter, the inner diameter of the outer tubular member and the outer diameter of the inner tubular member forming an annulus therebetween; and
   an annular seal disposed between the outer tubular member and the inner tubular member to seal the annulus, the annular seal being resilient to permit relative movement between the outer tubular member and the inner tubular member, and the annular seal comprising in a radial cross-section:
   a first annular leg portion terminating at an end that is radially inward, the first annular leg portion comprising a first open loop; and
   a second annular leg portion extending from the first annular leg portion and terminating at an end that is radially outward, the second annular leg portion comprising a second open loop and a third open loop, wherein the inner tubular member comprises a reduced diameter portion that forms an inner groove in an outer surface of the inner tubular member, wherein a portion of the first annular leg portion is received within the inner groove, and wherein the end of the first annular leg portion is restrainably attached within the inner groove.

2. The seal assembly of claim 1, wherein the end of the first annular leg portion is restrainably attached to at least one of the inner tubular member and the outer tubular member, and wherein the end of the second annular leg portion is restrainably attached to the other of the inner tubular member and the outer tubular member.

3. The seal assembly of claim 1, wherein the outer tubular member comprises an increased diameter portion that forms an outer groove in an inner surface of the outer tubular member, wherein a portion of the second annular leg portion is received within the outer groove, and wherein the end of the second annular leg portion is restrainably attached within the outer groove.

4. The seal assembly of claim 1, wherein the first open loop and the second open loop comprise opposing arcuate convolutions.

5. The seal assembly of claim 4, wherein the second open loop and the third open loop comprise opposing arcuate convolutions.

6. The seal assembly of claim 1, wherein the first open loop extends from the end of the first annular leg portion and extends axially along a first axial direction and curves to extend axially along a second axial direction that is opposite the first axial direction.

7. The seal assembly of claim 6, wherein the second open loop extends from the first open loop and extends axially along the second axial direction and curves to extend axially along the first axial direction.

8. The seal assembly of claim 7, wherein the third open loop extends from the second open loop axially along the first axial direction and curves to extend axially along the second axial direction to the end of the second annular leg portion.

9. The seal assembly of claim 1, wherein first open loop and the second open loop collectively span at least about 80% of a radial width of the annulus.

10. The seal assembly of claim 9, wherein at least one of the first open loop and the second open loop spans at least about 50% of the radial width of annulus.

11. The seal assembly of claim 1, wherein the first open loop forms a curved portion that spans an arc of at least about 90 degrees.

12. The seal assembly of claim 11, wherein the second open loop forms a curved portion that spans an arc of greater than 90 degrees.

13. The seal assembly of claim 12, wherein the third open loop forms a curved portion that spans an arc of greater than 90 degrees.

14. The seal assembly of claim 1, wherein the first open loop has radius of curvature r1, and wherein the second open loop has a radius of curvature, r2, and wherein r1 is less than r2.

15. The seal assembly of claim 14, wherein the second open loop has a radius of curvature, r2, and wherein the third open loop has radius of curvature, r3, and wherein r2 is greater than r3.

16. The seal assembly of claim 15, wherein the first open loop has radius of curvature r1, wherein the third open loop has radius of curvature, r3, and wherein r1 is greater than or equal to r3.

17. The seal assembly of claim 1, wherein the first open loop has a radial width, w1, wherein the second open loop has a radial width w2, and wherein w1 is less than w2.

18. The seal assembly of claim 17, wherein the first open loop has a radial width, w1, wherein the second open loop has a radial width w2, wherein the third open loop has a radial width, w3, and wherein each of w1 and w2 are greater than w3.

19. The seal assembly of claim 17, wherein the first open loop has a radial width, w1, wherein the second open loop has a radial width w2, wherein the third open loop has a radial width, w3, wherein w1 is equal to w3, and wherein w2 is greater than each of w1 and w3.

20. The seal assembly of claim 1, wherein the annular seal is formed from a plurality of plies of material.

* * * * *